G. KEISLING & J. D. BROWN.
STEAM TRAP.
APPLICATION FILED JAN. 6, 1909.
952,814.
Patented Mar. 22, 1910.
2 SHEETS—SHEET 2.
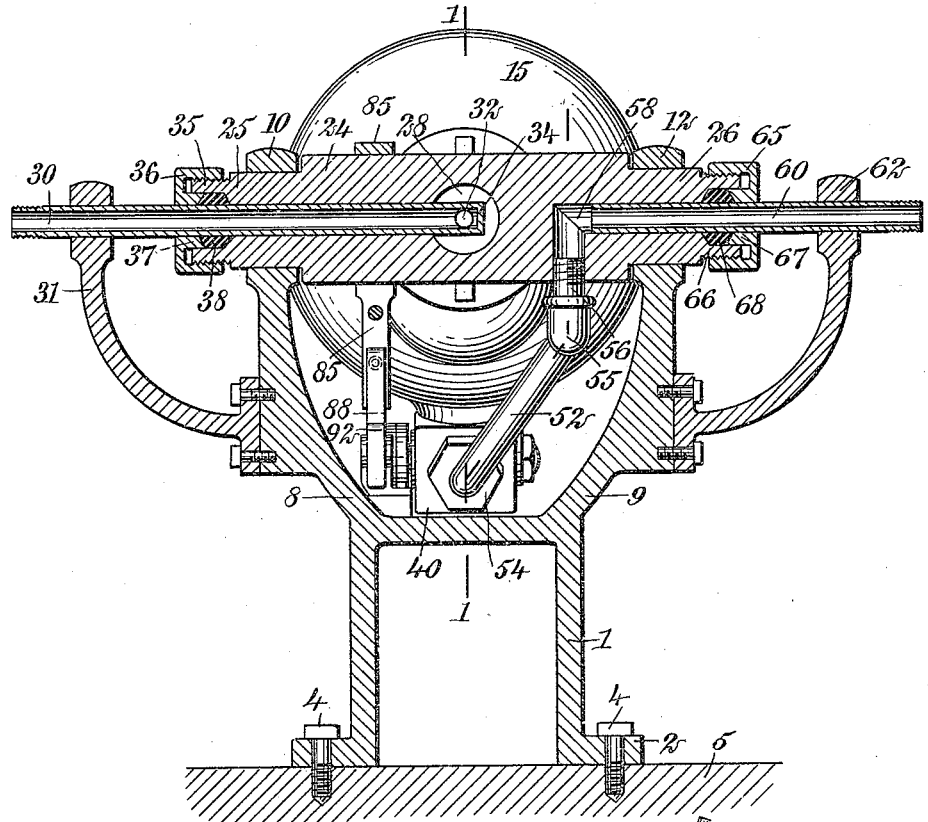
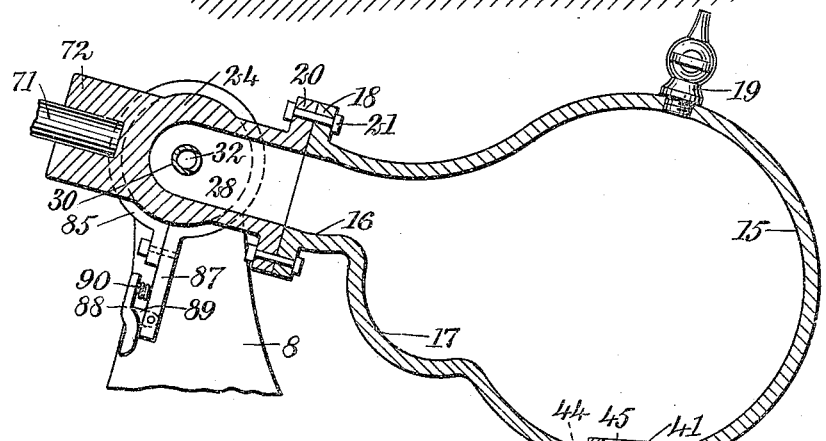
WITNESSES
J. A. Brophy
Wm. J. Sperl
INVENTORS
George Keisling
James D. Brown
BY
Munn & Co.
ATTORNEYS

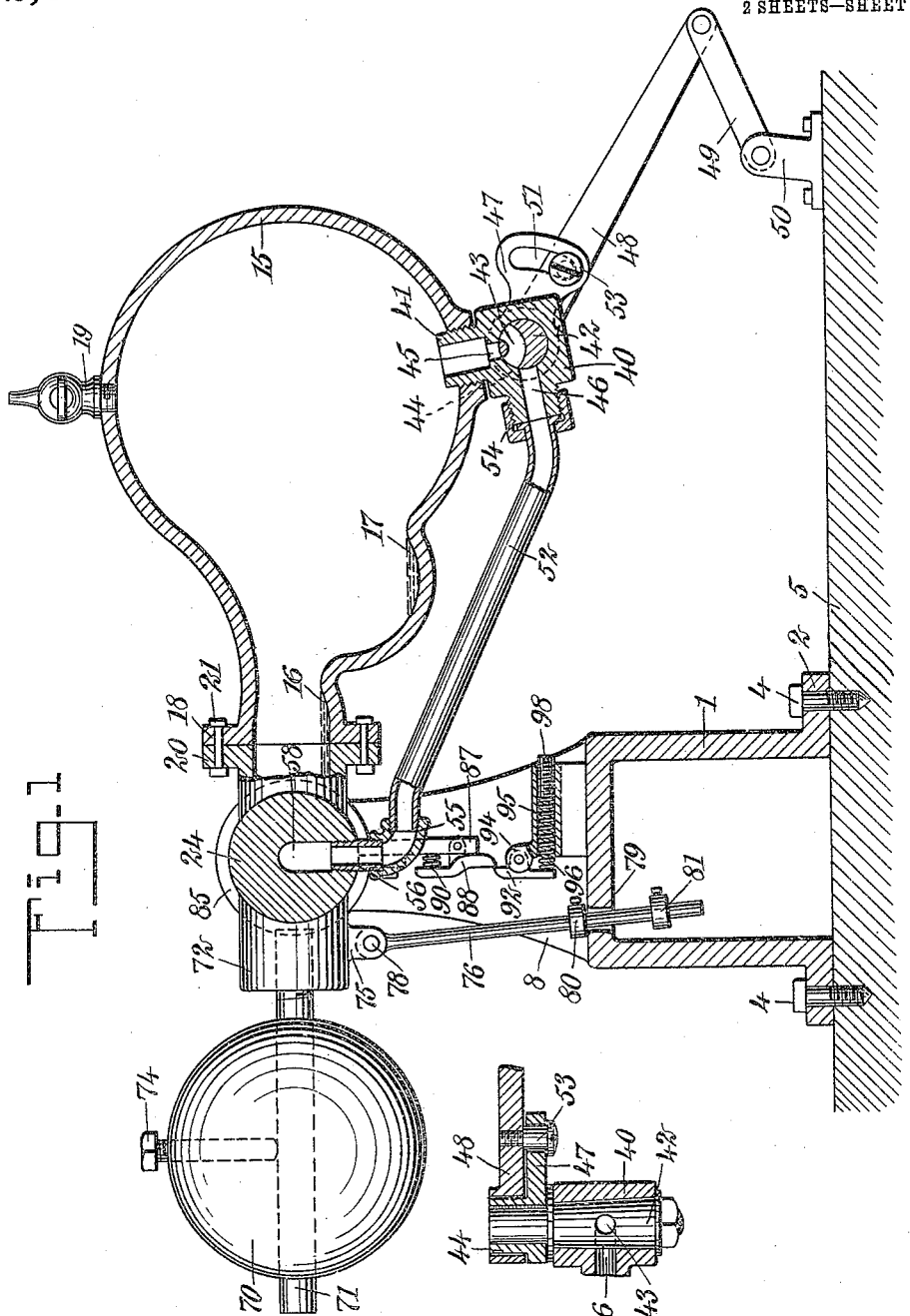

UNITED STATES PATENT OFFICE.

GEORGE KEISLING, OF SCRANTON, AND JAMES DONALD BROWN, OF DUNMORE, PENNSYLVANIA.

STEAM-TRAP.

952,814.

Specification of Letters Patent. Patented Mar. 22, 1910.

Application filed January 6, 1909. Serial No. 470,949.

*To all whom it may concern:*

Be it known that we, GEORGE KEISLING and JAMES DONALD BROWN, both citizens of the United States, and residents, respectively, of Scranton, in the county of Lackawanna and State of Pennsylvania, and of Dunmore, in the county of Lackawanna and State of Pennsylvania, have invented a new and Improved Steam-Trap, of which the following is a full, clear, and exact description.

This invention relates to steam traps which are adapted to be introduced into steam distribution systems, for the purpose of collecting the condensed steam and discharging the water when a sufficient amount has been collected.

It has particular reference to that type of steam traps which operate automatically by the gravitation of the accumulated water within the trap, and which resume their normal condition when sufficient of the water has been discharged therefrom.

One object of the invention is to provide a steam strap capable of forcing the water therein to an elevated position.

A further object is to provide means for preventing the tilting of the reservoir of the trap until a pre-determined amount of liquid has been collected therein, whereupon the reservoir is allowed to tilt quickly and the pressure of the steam operates to drive the liquid through the upwardly-inclined discharge pipe.

A still further object is to provide a trap with a plurality of pockets for receiving liquid and shifting the balance of the reservoir.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a sectional view taken on the line 1—1 of Fig. 2; Fig. 2 is a vertical section, taken centrally, of the bearings of the trap; Fig. 3 is a central longitudinal vertical section, with parts broken away, and Fig. 4 is a fragmentary sectional view of the valve-operating connections, with the valve body in elevation.

The base 1 may be provided with laterally-extending lugs 2 at the bottom, for the reception of bolts or screws 4, whereby the trap may be fastened to any suitable support 5. Extending upwardly on opposite sides of the base 1 are arms 8 and 9, having bearings 10 and 12, respectively, at their upper ends.

The reservoir 15 is formed in its lower portion with pockets 16 and 17, which are arranged in cascade relation. The inner end of the reservoir 15 is reduced in size and provided with a flange 18, which is arranged to be bolted against a corresponding flange 20 by means of bolts 21. The flange 20 forms the extremity of a supporting member 24, having trunnions or journals 25 and 26, which are received within the bearings 10 and 12 respectively. The supporting member 24 is formed with a recess or chamber 28, centrally thereof, which extends laterally to communicate with the inner end of the condensing reservoir 15 and forms a portion of the pocket 16. Although the reservoir 15 is shown as circular in transverse section, it may be made rectangular if desired. An air cock 19 may also be provided.

A steam inlet pipe 30 is supported in a bracket 31 bolted against the arm 8. Said steam inlet pipe 30 extends longitudinally into the bearing member 24, and is provided with an aperture 32 which affords communication with the chamber 28. The inner end 34 of the pipe 30 is closed. In order to provide a steam-tight joint between the stationary steam pipe 30 and the oscillating bearing member 24, the trunnion 25 is reduced and threaded at 35 to receive a similarly threaded cap 36 having a gland 37 formed thereon for retaining packing 38 about the pipe 30.

A valve casing 40 is formed with a threaded nipple 41, which is screwed in the bottom of the reservoir 15. Said valve casing is provided with a cylindrical valve 42 having an angular passage 43 therein, which is adapted to afford communication between a passage 45 and a passage 46, which are at right-angles to each other and formed in the valve body 40. A sleeve 44 is keyed to the valve 42 and provided with a laterally-projecting plate 47 having a sector-shaped slot 51 formed therein. A crank arm 48 is rotatably mounted about the sleeve 44 at one end and connected to the plate 47 by means of a screw 53 passing through the slot 51 and threaded into said crank arm. The other end of the crank-arm 48 is pivoted to a link 49, which in turn is pivotally connected to a bracket 50 mounted upon the support 5. The slot 51 enables the reservoir 15 to tilt several inches before the upper end of said slot comes in contact with the screw 53, whereupon the blow occasioned by said contact operates to give the valve 42 a sudden impulse and thereby overcome any tendency which said valve may have to stick. The valve body 40 may be provided with a pipe whereby the contents of the reservoir 15 may be discharged directly into some other receptacle, or a discharge pipe 52 may be connected to communicate with the passage 46 by means of a screw-threaded cap 54. The other end of the discharge pipe 52 is connected with an elbow 55 threaded upon a nipple 56 secured to the under side of the bearing 24 and communicating with an angular passage 58 formed therein. The passage 58 is continued by means of a pipe 60 rotatably mounted within the bearing member 24, and held in a bracket 62 bolted upon the arm 9. In order to provide a steam-tight joint between the pipe 60 and the bearing member 24, a stuffing-box is provided, comprising a cap 65, which is threaded to fit the reduced portion 66 of the trunnion 26, and is also provided with an inwardly-extending gland 67 which bears against a packing 68.

In order to counter-balance the reservoir 15, when empty, a counter-weight 70 may be provided, which is adjustably mounted upon a rod 71 secured at one end in a boss 72 which projects laterally from the bearing member 24. The weight 70 may be retained upon the rod 71 by means of a set-screw 74, or in any other suitable manner.

Projecting from the under side of the boss 72 is a lug 75, to which the upper end of a rod 76 is pivotally connected by means of a bolt or pin 78. The lower end of the rod 76 extends through a hole 79 formed in the upper end of the base 1. Said rod is provided with a pair of collars 80 and 81, which are adjustably secured thereto in order to limit the motion of the reservoir 15 by the engagement of the collars with the upper end of the base 1.

A strap 85 is clamped about the bearing member 24, and formed with a depending extension 87. A catch 88 is formed with a lug 89, which is pivotally connected to the extension 87. A coiled spring 90 is retained between the extension 87 and the upper portion of the catch 88.

A catch 92 is pivoted in lugs 94 formed on the upper side of the base 1. A coiled spring 96 is retained within a sleeve 95 and bears at one end against the catch 92 and at its other end against an adjusting screw 98. The tension of the spring 96 may be adjusted in order to counter-balance any desired amount of liquid in the reservoir 15. When the desired amount of liquid has been entrapped within the reservoir 15, the catches 88 and 92 become disengaged, thereby allowing the reservoir 15 to oscillate rapidly, and the liquid contained therein rushes to the bottom of the reservoir and is forced out through the discharge pipe 52. As soon as all the water has been discharged from the reservoir 15, the counter-weight 70 restores the reservoir 15 to the horizontal position, and the valve 42 is automatically closed, thus preventing the escape of any steam through the trap.

We desire it to be understood that while we have described our invention as a steam trap, it is obvious that the condensations from any vapor having sufficient pressure to discharge the contents of the reservoir 15, could be caught and discharged by our improved trap when the same is connected up with such vapor system, and we therefore do not desire to limit our invention to a steam trap.

Having thus described our invention, we claim as new and desire to secure by Letters Patent:—

1. In a trap of the character described, a counter-balanced reservoir provided with a series of pockets in cascade relation, said reservoir being provided with supports upon which it is pivotally swung for oscillation, an inlet pipe leading to the interior of the reservoir, an outlet connection for said reservoir, a valve therefor, and means for operating said valve upon the oscillation of said reservoir.

2. In a trap of the character described, the combination of a normally counter-balanced reservoir, a stationary inlet pipe leading thereto, a valve-controlled outlet connection, and means for operating said valve, said reservoir having a plurality of pockets in cascade relation for shifting the balance of the reservoir.

3. In a trap of the character described, the combination of a pivoted reservoir, means for counter-balancing said reservoir, adjustable means independent of said counter-balancing means for preventing said reservoir from tilting until a predetermined amount of liquid is collected therein, an inlet connection communicating with said reservoir, an outlet connection for said reservoir, a valve for controlling said outlet connection, and a lever mechanism for operating said valve.

4. In a trap of the character described, the combination of a pivoted and counter-balanced reservoir, a spring catch for preventing said reservoir from tilting until a predetermined amount of liquid is contained therein, an inlet connection communicating with said reservoir, an outlet connection for said reservoir, a valve for controlling said outlet connection, and a lever mechanism for operating said valve.

5. In a trap of the character described, the combination of a pivoted reservoir, means for counter-balancing said reservoir, an adjustable spring catch for preventing said reservoir from tilting until a predetermined amount of liquid is contained therein, an inlet connection communicating with said reservoir, an outlet connection leading from the bottom of the reservoir and extending through a trunnion of said reservoir, a valve for controlling said outlet connection, a lever mechanism for operating said valve, and a stop for limiting the movement of said reservoir.

6. In a trap of the character described, the combination of a normally counterbalanced reservoir, an inlet pipe leading thereto, an outlet connection for said reservoir, a valve for controlling said outlet connection, spring-controlled means for permitting said reservoir to be lowered under a predetermined load, and a lever mechanism for operating said valve upon the oscillation of the reservoir.

7. In a trap of the character described, a pivoted and counter-balanced reservoir, an inlet for the reservoir, an outlet connected with the bottom of the reservoir, a valve for said outlet, a sleeve secured to the stem of the valve and provided with a projecting member, an arm having one end loosely mounted on the sleeve, a pin and slot connection between the member and arm, and a link pivoted to a fixed support and to the other end of said arm.

8. In a trap of the character described, a pivoted and counter-balanced reservoir, an inlet for the reservoir, an outlet connected with the bottom of the reservoir, a valve for the outlet, a sleeve secured on the stem of the valve and provided with a projecting member having a sector-shaped slot therein, an arm having one end loosely mounted on the sleeve and provided with a pin working in the slot of said member, and a link pivoted to a fixed support and to the other end of said arm.

9. In a trap of the character described, a pivoted reservoir, an inlet for the reservoir, an outlet connected with the bottom of the reservoir, a valve for the outlet, means for operating the valve upon the tilting of the reservoir, a pivoted and spring pressed catch movable with the reservoir, and a pivoted and spring pressed catch on a fixed support and engaging the first named catch.

In testimony whereof we have signed our names to this specification in the presence of two subscribing witnesses.

GEORGE KEISLING.
JAMES DONALD BROWN.

Witnesses:
THOMAS BEADEL,
JOHN MITCHELL.